Sept. 18, 1962 L. BUSTIN 3,054,477
NON-SLIP WHEEL CHOCK
Filed Feb. 2, 1961

INVENTOR.
LEOPOLD BUSTIN
BY Percy Freeman
ATTORNEY.

United States Patent Office 3,054,477
Patented Sept. 18, 1962

3,054,477
NON-SLIP WHEEL CHOCK
Leopold Bustin, Flanders, N.J.
Filed Feb. 2, 1961, Ser. No. 86,652
3 Claims. (Cl. 188—32)

This invention relates to wheel chocks and, more particularly, to a non-slip wheel chock for vehicle wheels.

It is an object of the present invention to provide a wheel chock which is readily adjustable to accommodate vehicle wheels of different sizes, and which will maintain frictional contact with the ground at all times to prevent slipping thereof.

A further object of the present invention is to provide an adjustable size wheel chock of the type described having a hingedly mounted wheel size adapter which can be selectively rotated to association with the main wheel engaging surface thereof to adjust the size of the wheel chock to accommodate vehicle wheels of smaller diameter.

An additional object of the present invention is to provide an adjustable wheel chock of the aforementioned type having a serrated ground engaging surface and a variable wheel engaging surface which will ensure sufficient frictional contact with the ground at all times to prevent slipping of the wheel chock relative thereto.

All of the foregoing and still further objects and advantages of this invention will become apparent from a study of the following specification, taken in connection with the accompanying drawing, wherein.

Figure 1:
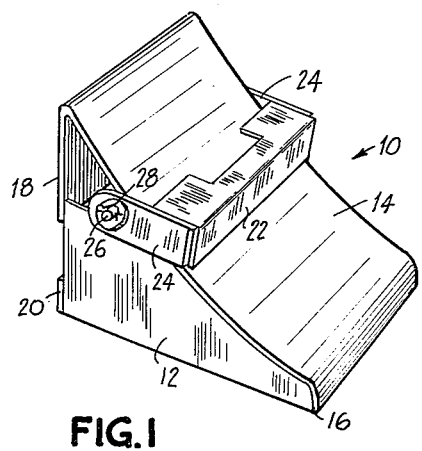
FIG. 1 is a perspective view of a wheel chock made in accordance with the present invention with the wheel size adapter thereof in an operative position overlying the main wheel engaging surface thereof.
Figure 2:
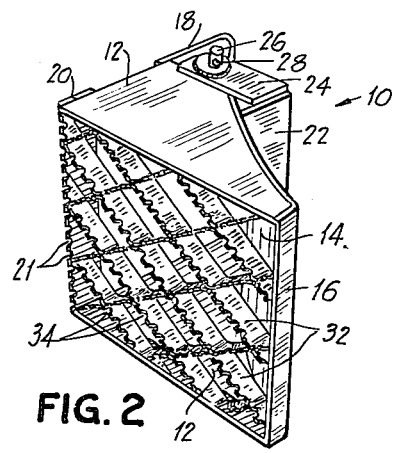
FIG. 2 is a bottom perspective view of the device shown in FIG. 1.
Figure 3:
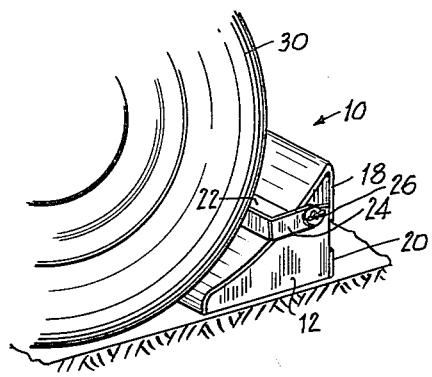
FIG. 3 is a perspective view of the device shown in FIG. 1 in actual use.

Referring now to the drawing, and more particularly to FIGS. 1 to 3 thereof, an adjustable wheel chock 10 made in accordance with the present invention is shown to include a base having a pair of spaced apart parallel side plates 12 connected to the opposite side edges of an arcuate wheel engaging plate 14 having one lower end in the form of a flange 16 overlying the front end of the side plates 12.

A back bar 20 extends between the rear ends of the side plates 12 to ensure sufficient rigidity of the base assembly. The uppermost end of the wheel engaging plate 14 is provided with a depending web 18 secured to the upper ends of the side plates 12 to further increase the rigidity of the assembly.

The upper ends of the side plates 12 are spaced from the uppermost end of the wheel engaging plate 14, and support a transversely extending shaft 26 upon which one end of each of a pair of sides 24 of a wheel size adapter bar 22 are mounted. The bar 22 forms a bight portion of the substantially U-shaped wheel size adapter.

Figure 4:
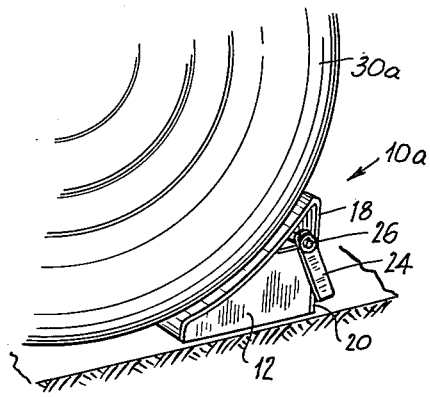
FIG. 4 is a view similar to FIG. 3, illustrating the manner in which the wheel chock is used with vehicle wheels of large diameter.

The length of the sides 24 of the bail type wheel size adapter is slightly greater than the distance between the upper end of the wheel engaging plate 14 and the pivot axis of the shaft 26, thus permitting the adapter to be swung rearwardly over the upper end of the base, as shown in FIG. 4 for accommodating wheels of larger size than those accommodated by the chock with the adapter in the operative position shown in FIG. 3.

Mounted within the bottom of the base, between the side plates 12, flange 16, and back bar 20, are a plurality of angularly related tread bars 32 each having a plurality of downwardly projecting teeth 34 for frictional engagement with the ground. The back bar 20 is also provided with a plurality of downwardly depending teeth 21 for furthering the frictional engagement of the wheel chock with the supporting ground surface.

It will now be recognized that in actual use, the wheel chock 10 may be readily used with smaller diameter wheels 30, such as automobile wheels, simply by rotating the adapter into the operative position as shown in FIG. 3, so that at least two point contact is assured between the wheel and the chock bar, thus ensuring sufficient downward force upon the wheel chock to establish sufficient frictional engagement between the tread bars and the supporting ground surface to prevent slippage. It will be noted that the bail portion 22 of the adapter is of generally angle-shaped cross-sectional configuration, thus also ensuring contact along both free edges thereof with the surface of the wheel engaging plate 14.

In order to use this wheel chock with a larger size wheel 30a, it is only necessary to rotate the adapter bar of the assembly 10a, as shown in FIG. 4, to the rearwardly disposed position, whereby the arcuate surface of the wheel engaging plate 14 conforms substantially to the surface configuration of the wheel 30a, thus assuring a positive engagement of the parts with both the wheel and the ground.

While this invention has been described with particular reference to the construction shown in the drawing, it is to be understood that such is not to be construed as imparting limitations upon the invention, which is best defined by the claims appended hereto.

Having thus described my invention, what I claim as new and desire to secure by Letters Patent is:

1. A wheel chock comprising, in combination, a base having a substantially flat ground engaging surface and an arcuate plate having a wheel engaging surface extending upwardly from one lower end thereof, said wheel engaging surface defining an arc having a radius substantially equal to a radius of curvature of one size vehicle wheel, and a bail member carried by said base for selective movement into a position overlying said wheel engaging surface intermediate the upper and lower ends thereof to define a wheel abutment with said lower end of said base for engagement with a wheel of smaller radius than said one size vehicle wheel, said bail member having a pair of sides each pivotally connected at one end to opposite sides of said base, and a bight bar extending transversely between the opposite ends of said sides; and said ground-engaging surface comprising a plurality of angularly related criss-crossed tread bars, each having a large number of downwardly directed projections for anti-slip frictional engagement with the ground in all directions.

2. A wheel chock as set forth in claim 1, wherein the length of the sides of said bail is greater than the distance between the upper end of said base and the pivot axis of said bail sides to accommodate hinged movement of said bail member over the upper end of said base from said position overlying said wheel engaging surface.

3. A wheel chock as set forth in claim 2, wherein said base includes a pair of side plates extending between said arcuate plate and said tread bars pivotally supporting said bail member for said hinged movement thereof from said position overlying said wheel engaging surface of said plate.

References Cited in the file of this patent
UNITED STATES PATENTS

| | | |
|---|---|---|
| 2,117,026 | Kennedy | May 10, 1938 |
| 2,613,764 | Worden | Oct. 14, 1952 |
| 2,797,774 | Eckhart | July 2, 1957 |

FOREIGN PATENTS

| | | |
|---|---|---|
| 675,784 | France | Nov. 8, 1929 |